Patented May 23, 1933

1,911,030

UNITED STATES PATENT OFFICE

GEORGE W. MILES, OF BOSTON, MASSACHUSETTS, ASSIGNOR TO CELANESE CORPORATION OF AMERICA, A CORPORATION OF DELAWARE

PURIFICATION OF CELLULOSIC MATERIAL

No Drawing. Application filed March 22, 1928. Serial No. 263,979.

This invention relates to the purification of cellulosic material such as cotton, cotton linters, wood pulp, etc., and relates particularly to the purification of such cellulosic material prior to the use and/or esterification of the same.

An object of my invention is to treat cellulosic materials of all kinds in order to remove impurities of all kinds, so as to render them more suitable for the various uses to which they may be put.

Another object of my invention is to remove substantially all impurities from cellulosic materials whereby derivatives may be made from such material, which derivatives form good yarns, films, varnishes and the like. Other objects of my invention will appear from the following detailed description.

Cotton linters, and other cellulosic material, as ordinarily received from the manufacturer contains impurities such as sand, soaps, waxes, resins, oils, alkalies and other mineral matter, such as compounds of iron or of other metals. Cellulose derivatives such as cellulose acetate made from such cotton linters, produce films or other articles having properties that are not perfect. This invention is directed towards the removal of such impurities.

In accordance with my invention I treat the cellulosic material in the usual manner with alkali, bleach the same and then extract the same with a solvent for soaps, waxes, oils and the like. The cellulosic material may be given a prior treatment with hydrofluoric acid to remove sand or other mineral matter. After purification, the cellulosic material may be used for any desired purpose, or it may be converted into derivatives such as cellulose esters, cellulose ethers and the like.

The cellulosic material to be treated in accordance with my invention may be cotton, cotton linters or wood pulp of all kinds, or any other cellulosic material, derived from any suitable source.

The removal of soaps, waxes, resins and the like is preferably effected by extraction with acetic acid, formic acid, propionic acid or any other suitable aliphatic acid.

In order to illustrate my invention, the following detailed description of all the steps that may be used for the purification of cotton linters are given, but it is to be understood that some of these steps may be omitted, or that variations may be made in the steps without departing from the spirit of my invention.

1—Cotton linters are moistened with a dilute solution of hydrofluoric acid, and the hydrofluoric acid is permitted to remain on the cottom linters at room temperature for a sufficiently long time to dissolve the sand or other siliceous material. The time required for this action will vary depending on the conditions and the amount of sand present and proceeds quickly when the siliceous material is present in a finely divided form, or if the linters are so treated that the siliceous material is in finely divided form. I have found that ordinarily a period of 7 to 10 days of soaking with the hydrofluoric acid is sufficient to effect the desired removal or solution of the siliceous material. The hydrofluoric acid not only removes the sand and other siliceous material but, also removes or renders removable by washing, the alkali, lime and alumina that may be present, thus preventing the formation of insoluble soaps with the wax, oil or resin present. The cotton linters are then washed with water to remove the hydrofluoric acid and the products of reaction. If no sand or other siliceous material is present in the cotton linters, or if it is not desired to remove the sand or siliceous matter when present, this step of treating with hydrofluoric acid may be omitted if the cotton linters are subsequently extracted with acetic acid or other aliphatic acids.

2—The cotton linters, after prior treatment with hydrofluoric acid, or without such prior treatment, contains lignin, wax, oil and resin, etc. To remove the lignin the linters are boiled with alkali in the usual manner and are then washed.

3—If desired, the linters may be treated or warmed with a very weak aqueous solution of a mineral acid such as sulphuric acid or hydrochloric acid to remove any iron compounds that may have been imparted to the linters from the washing water. However, since the subsequent bleaching step generally removes such iron compounds, this step of treatment with dilute mineral acid is not absolutely necessary.

4—The linters are then bleached in the ordinary manner, say by chlorine or bleaching powder or in any other suitable manner and then washed with water to remove the bleaching agent.

5—The linters are then treated to remove the oils, waxes, etc. In one mode of carrying out my invention, the linters are dried and extracted with such solvents as carbon tetrachloride, naphtha, etc. to remove any wax or oil that may be present. They may then be considered fully purified and ready for transformation into cellulose derivatives but preferably they should be further extracted with aliphatic acids as described in paragraph 6 below.

6—The linters after the bleaching and washing treatments set forth in paragraph 4, may be pressed to remove necessary water or dried in any suitable manner, and are then extracted with hot aliphatic acids. Instead of treating the linters with the aliphatic acid directly after the pressing step, the linters may first be extracted in the manner set forth in paragraph 5. While any suitable aliphatic acid such as formic or propionic acid may be used, I shall describe my invention in connection with acetic acid. If the excess water has been removed from the linters by pressing, glacial acetic acid or even acetic anhydride in amounts to form say, a 65 to 95% or stronger acetic acid solution may be used. If substantially all the water has been removed from the cotton linters by drying, ordinary acetic acid or aqueous acetic acid may be used. The cotton linters may be extracted at elevated temperatures with the acetic acid in any suitable manner. In one mode of treatment, the cotton linters are extracted by acetic acid vapors which are permitted to condense within the cotton linters. In another form, the hot liquid acetic acid is passed repeatedly through the cotton linters. In still another form, the extraction is done by means of hot acetic acid using the counter current principle; that is the fresh acetic acid first comes in contact with the most completely extracted cotton linters, while the almost charged acetic acid comes in contact with the fresh cotton linters. In all cases, the hot acetic acid removes the insoluble soaps, oils, waxes or resins present. For this reason, when the acetic acid extraction is used, the use of hydrofluoric acid as set forth in paragraph 1 is not absolutely necessary, except for the removal of sand or siliceous matter. The acetic acid dissolves the wax and resin and breaks down the insoluble soaps to form free fatty acids which are dissolved in the acetic acid.

The cotton linters, wood pulp or other cellulosic material after purification as set forth above, may be used for any purposes for which a purified cellulosic material is ordinarily used.

As an example of an application of the purified cellulosic material, it may be stated that the cotton linters so purified may be used for making esters both inorganic, as cellulose nitrate, or organic, such as cellulose acetate, cellulose formate, cellulose propionate or cellulose butyrate. The cotton linters may also be washed and etherified to form cellulose ethers such as ethyl cellulose, methyl cellulose or benzyl cellulose, etc. If celulose acetate is to be made, the cotton linters containing the acetic acid used in the detailed description given above may be directly acetylated by the addition of appropriate amounts of acetic acid, acetic anhydride and a catalyst such as sulphuric acid.

The cellulose derivatives which may be made from the cellulosic material purified in accordance with my invention may be used for making lacquers, dopes, films, artificial yarn, plastic masses, etc., according to any suitable process.

It is to be understood that the foregoing details are given merely by way of illustration and that many variations may be made therein without departing from the spirit of this invention.

Having described my invention what I claim and desire to secure by Letters Patent is:

1. The process of purifying cellulosic material comprising treating the same with hydrofluoric acid and subsequently extracting the same with hot aliphatic acid.

2. The process of purifying cellulosic material comprising treating the same with hydrofluoric acid and subsequently extracting the same with hot acetic acid.

3. The process of purifying cotton linters comprising treating the same with hydrofluoric acid and subsequently extracting the same with hot aliphatic acid.

4. The process of purifying cotton linters comprising treating the same with hydrofluoric acid and subsequently extracting the same with hot acetic acid.

5. The process of purifying cellulosic material comprising treating the same with alkali, washing and subsequently extracting with hot aliphatic acid.

6. The process of purifying cellulosic material comprising treating the same with alkali, washing and subsequently extracting with hot acetic acid.

7. The process of purifying cotton linters comprising treating the same with alkali, washing and subsequently extracting with hot acetic acid.

8. The process of purifying cotton linters comprising treating the same with hydrofluoric acid, then with alkali, subsequently bleaching the same, and then extracting the oils, resins and the like.

9. The process of purifying cotton linters comprising treating the same with hydrofluoric acid, then with alkali, subsequently bleaching the same and then extracting the oils, resins and the like with hot acetic acid.

10. The process comprising extracting impurities from cellulosic material by means of hydrofluoric acid and hot aliphatic acid and then converting the cellulosic material into a cellulose derivative.

11. The process comprising extracting impurities from cellulosic material by means of hydrofluoric acid and hot aliphatic acid and then esterifying the cellulosic material into a cellulose ester.

12. The process comprising extracting impurities from cotton linters by means of hydrofluoric acid and hot acetic acid and then converting the cellulose into a cellulose derivative.

13. The process comprising extracting impurities from cotton linters by means of hydrofluoric acid and hot acetic acid and then acetylating the cotton linters into a cellulose acetate.

14. The process of purifying cellulose material comprising treating the same with hydrofluoric acid and subsequently treating the same with an aliphatic acid.

In testimony whereof, I have hereunto subscribed my name.

GEORGE W. MILES.